(No Model.)
T. A. EDISON.
GAGE FOR TESTING FIBERS FOR INCANDESCENT LAMP CARBONS.
No. 438,300. Patented Oct. 14, 1890.
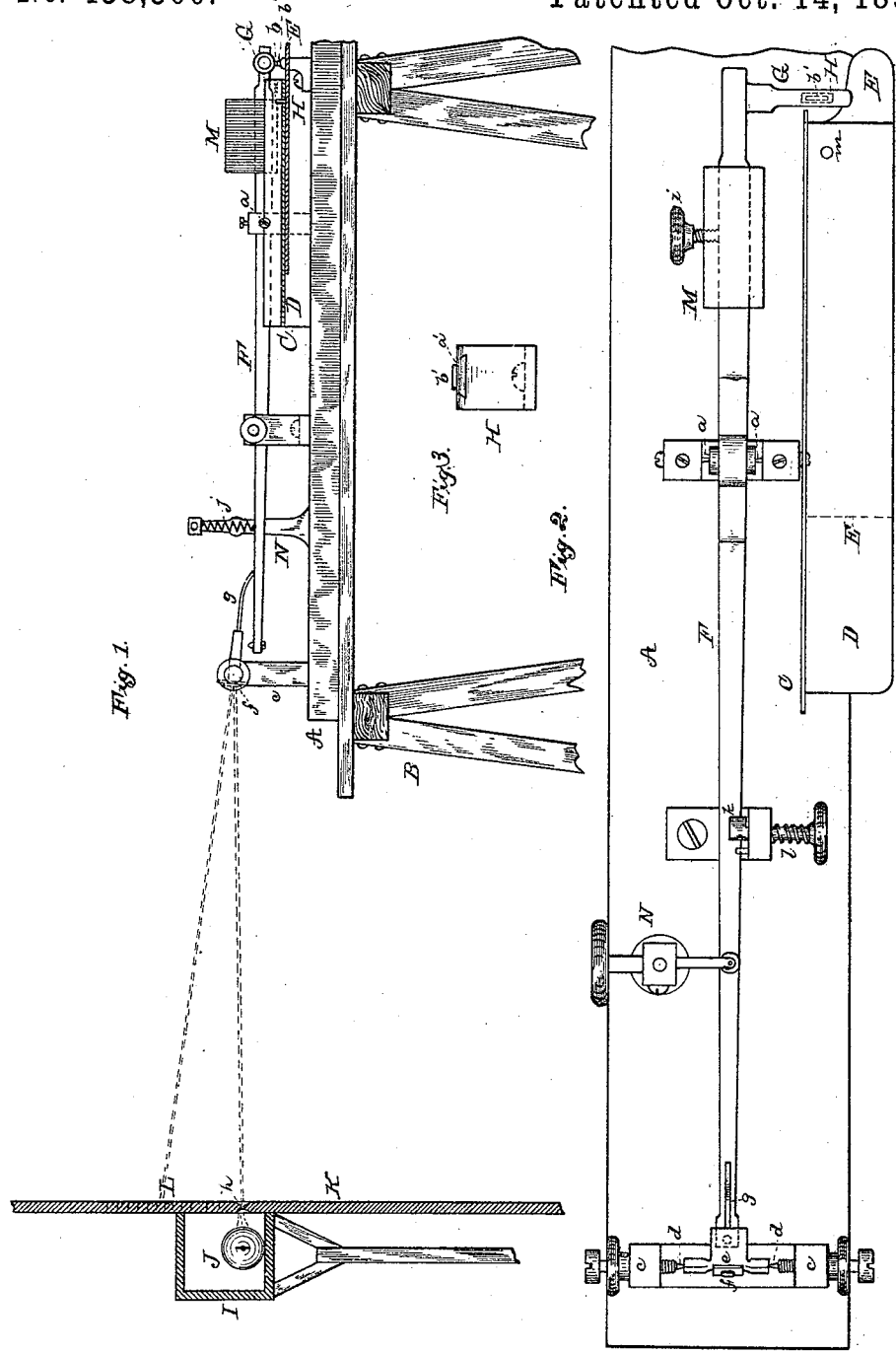
ATTEST:
E. C. Rowlands
H. W. Seely
INVENTOR:
Thomas A. Edison,
By Rich'd N. Dyer,
Atty.

UNITED STATES PATENT OFFICE.

THOMAS A. EDISON, OF MENLO PARK, NEW JERSEY.

GAGE FOR TESTING FIBERS FOR INCANDESCENT-LAMP CARBONS.

SPECIFICATION forming part of Letters Patent No. 438,300, dated October 14, 1890.

Application filed June 7, 1883. Serial No. 97,324. (No model.)

*To all whom it may concern:*

Be it known that I, THOMAS A. EDISON, of Menlo Park, in the county of Middlesex and State of New Jersey, have invented a new and useful Improvement in Apparatus for Testing Fibers for Incandescing-Lamp Carbons, (Case No. 566,) of which the following is a specification.

The object of this invention is to test the perfection of the fibers, slips, or filaments which are to be carbonized for the incandescing conductors of electric lamps to determine whether any roughnesses or irregularities have been left upon their edges in cutting them from the larger pieces of material into the required shape. I have devised an apparatus for this purpose, which may be briefly described as follows: A yielding gage is provided through which the fiber is drawn, and a mirror on which light is thrown from a suitable source is moved by the movement of said gage. The reflected light from the mirror is thrown on a screen, preferably provided with a scale, and by the movement of such light the movements of the gage are made apparent. The apparatus is so arranged that a very slight difference in the width of the fiber will produce a considerable and readily-apparent deflection of the light.
A convenient form of this apparatus is illustrated in the annexed drawings, in which—

Figure 1 is a side elevation of the apparatus with the screen and the box containing the lamp in section; Fig. 2, a larger plan view of the apparatus without the lamp and screen, and Fig. 3 an end view of the stationary portion of the yielding gage.

The base A of the apparatus is set upon a suitable table B or other support. From the base rises a piece C, which supports a shelf D, and under said shelf a flat spring E.

F is a lever pivoted in bearings $a\,a$. Near the end of its shorter arm an arm G projects at right angles. This arm G extends out over the metallic block H, which rises from the base, and a projection or rib $b$ is formed on the lower side of said arm.

The upper part of the metal block H is grooved out and the metal piece $a'$ inserted therein, on top of which is attached the piece $b'$, of hard material, such as sapphire or agate. The use of such material prevents the gage from wearing out from the friction of the fibers passing over it. A similar piece may also be placed on the other side of the gage.

Beyond the other end of the lever standards $c\,c$ rise from the base A, and on bearing-points $d\,d$ on such standards is pivoted the piece $e$, which carries the mirror $f$. An arm $g$ extends back from the piece $e$ and rests upon the lever F.

I is a suitable box, within which is an incandescing electric lamp J, and in front of which is a screen K, having a scale on its face, the position of which is indicated at L. An aperture $h$ in the screen is opposite the lamp J, and the light from said lamp is thrown through said aperture upon the mirror $f$ and thence upon the scale at L, as indicated by the dotted lines.

A sliding weight M is placed on the short arm of the lever F, held in position by a set-screw $i$, and the long arm is supported by a spring $j$, attached to an arm extending from the standard N.

The extent of movement of the long arm of the lever is controlled by an eccentric $k$, which is turned by the shaft $l$ to press more or less closely upon the lever.

The fiber which is to be tested is laid edgewise on the shelf D between the edge C and the pin $m$, and the spring E, being drawn down, is placed between the sapphire piece $b'$ and the rib or projection $b$. Then the fiber is drawn along between $b$ and $b'$, and any irregularities in its width cause the lever F to move, throwing the mirror back or forward on its bearings and causing the spot of light which is thrown by the mirror on the screen to move up and down upon the scale. The movement of the short arm of the lever is of course very greatly magnified upon the scale, and very considerable and appreciable movements of the light are therefore produced by very slight irregularities in the fiber.

What I claim is—

1. The combination of a lever whose shorter arm forms the moving portion of a yielding gage, a pivoted arm resting on the longer arm of said lever, a mirror carried by said pivoted arm, and a lamp or other artificial source of light so situated as to shine directly upon said mirror, substantially as set forth.

2. The combination, with the lever whose short arm forms the moving portion of a yielding gage, and a mirror moved by the long arm of said lever, of means for adjusting the extent of movement of the lever, substantially as set forth.

3. The combination, with the lever forming part of a yielding gage and a mirror moved by said lever, of a sliding weight on the short arm of said lever, substantially as set forth.

This specification signed and witnessed this 1st day of June, 1883.

THOS. A. EDISON.

Witnesses:
H. W. SEELY,
EDWARD H. PYATT.